(12) United States Patent
Bowman-Amuah

(10) Patent No.: US 7,899,721 B2
(45) Date of Patent: Mar. 1, 2011

(54) E-COMMERCE SYSTEM, METHOD AND COMPUTER PROGRAM PRODUCT

(75) Inventor: Michel K. Bowman-Amuah, Colorado Springs, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 3017 days.

(21) Appl. No.: 09/796,106

(22) Filed: Feb. 27, 2001

(65) Prior Publication Data

US 2002/0120553 A1  Aug. 29, 2002

(51) Int. Cl.
*G06F 17/60* (2006.01)
(52) U.S. Cl. .................. 705/35; 705/26; 705/37
(58) Field of Classification Search .......... 705/35, 705/37; 235/377; 259/679
See application file for complete search history.

(56) References Cited

U.S. PATENT DOCUMENTS

| | | | |
|---|---|---|---|
| 4,789,928 A | 12/1988 | Fujisaki | 364/401 |
| 4,903,201 A | 2/1990 | Wagner | 364/408 |
| 5,715,402 A | 2/1998 | Popolo | 395/237 |
| 5,835,896 A | 11/1998 | Fisher et al. | 705/37 |
| 5,970,475 A * | 10/1999 | Barnes et al. | 705/27 |
| 6,058,417 A | 5/2000 | Hess | 709/219 |
| 6,202,051 B1 | 3/2001 | Woolston | 705/27 |
| 6,233,566 B1 | 5/2001 | Levine et al. | 705/37 |
| 6,266,651 B1 | 7/2001 | Woolston | 705/27 |
| 6,272,472 B1 * | 8/2001 | Danneels et al. | 705/27 |
| 6,325,632 B1 * | 12/2001 | Chao et al. | 434/322 |
| 6,405,177 B1 * | 6/2002 | DiMattina | 705/26 |
| 6,415,320 B1 | 7/2002 | Hess | 709/219 |
| 6,466,917 B1 | 10/2002 | Goyal | 705/18 |
| 6,523,037 B1 | 2/2003 | Monahan | 707/10 |
| 6,604,107 B1 | 8/2003 | Wang | 707/101 |
| 6,629,081 B1 * | 9/2003 | Cornelius et al. | 705/30 |
| 6,732,161 B1 | 5/2004 | Hess | 709/219 |
| 6,748,422 B2 | 6/2004 | Morin | 709/206 |
| 6,778,993 B2 | 8/2004 | Wang | 707/101 |
| 6,859,787 B2 | 2/2005 | Fisher | 705/26 |
| 6,944,599 B1 | 9/2005 | Vogel | 705/37 |
| 7,007,076 B1 | 2/2006 | Hess | 709/219 |
| 7,194,435 B1 * | 3/2007 | Sforzo | 705/37 |
| 2001/0039524 A1 | 11/2001 | Harrison, Jr. et al. | 705/35 |
| 2002/0055851 A1 | 5/2002 | Jacobs et al. | 705/1 |
| 2002/0055900 A1 * | 5/2002 | Kansal | 705/37 |
| 2002/0069150 A1 * | 6/2002 | Ni | 705/36 |

(Continued)

OTHER PUBLICATIONS

CCR Assistance Center staff, Central Contractor Registration Handbook, Feb. 2008, CCR Contractor Registration, web, pp. 1-15.*

(Continued)

*Primary Examiner* — James P Trammell
*Assistant Examiner* — Marissa Liu
(74) *Attorney, Agent, or Firm* — Finnegan, Henderson, Farabow, Garrett & Dunner, L.L.P.

(57) ABSTRACT

A system, method and computer program product are provided for e-commerce. In use, a plurality of suppliers are registered. In addition, goods-related information from customers is received, where the goods-related information is associated with goods. Access to the goods-related information by the suppliers is allowed utilizing a network. Further, offers relating to the goods from the suppliers are received utilizing the network, and the customers are informed of the offers. Still yet, a guarantee is provided to the customers regarding a qualification of at least one supplier with respect to a provision or fulfillment of the offer received therefrom. Such guarantee is provided as a function the at least one supplier or at least one action thereof.

26 Claims, 12 Drawing Sheets

U.S. PATENT DOCUMENTS

| | | | |
|---|---|---|---|
| 2004/0138962 A1 | 7/2004 | Kopelman | 705/26 |
| 2004/0138966 A1 | 7/2004 | Kopelman | 705/27 |
| 2005/0108109 A1 | 5/2005 | Wittsche | 705/26 |
| 2005/0108113 A1 | 5/2005 | Wittsche | 705/27 |
| 2005/0114229 A1 | 5/2005 | Ackley | 705/26 |
| 2005/0144035 A1 | 6/2005 | Fisher | 705/1 |
| 2005/0149543 A1 | 7/2005 | Cohen | 707/100 |
| 2005/0171917 A1 | 8/2005 | Femenia | 705/80 |
| 2005/0236789 A1 | 10/2005 | Knox | 280/795 |
| 2005/0240481 A1 | 10/2005 | Vogel | 705/16 |
| 2005/0273378 A1 | 12/2005 | MacDonald-Korth | 705/10 |
| 2005/0283353 A1 | 12/2005 | Billingsley | 703/23 |
| 2006/0010134 A1 | 1/2006 | Davis | 707/10 |

OTHER PUBLICATIONS

International Search Report from international application No. PCT/US02/05796 which was mailed on Feb. 14, 2003.
www.ebay.com "e-Bay—the World's Online Marketplace".
www.christies.com/magicofauctions/overview.asp "Christies—Magic of Auctions".

* cited by examiner

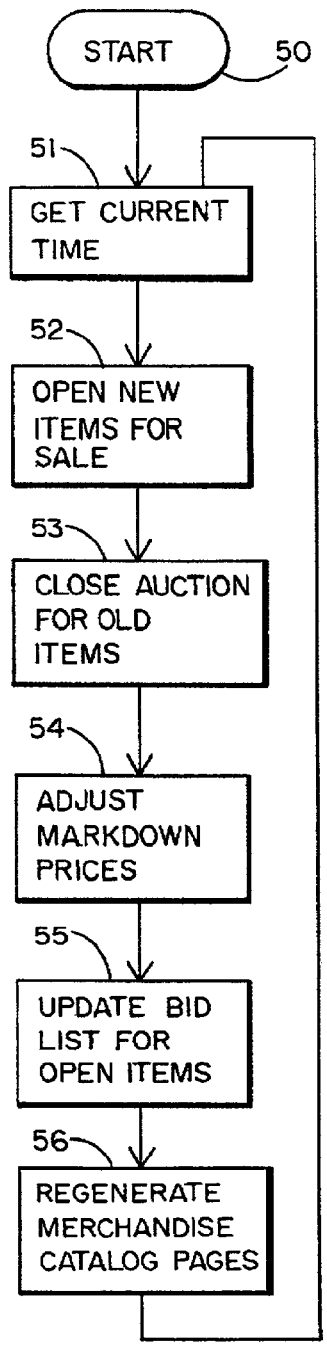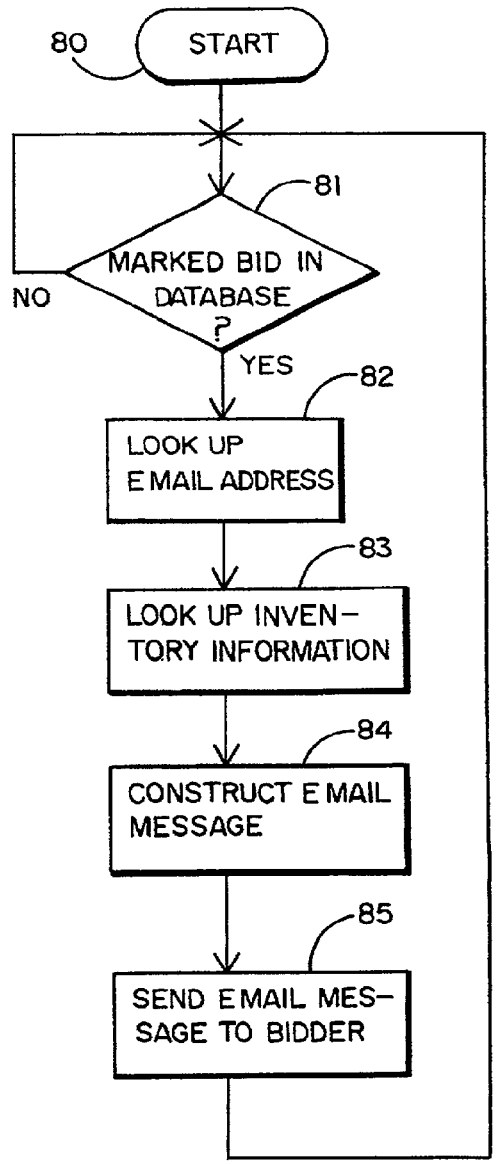
FIG. 6
FIG. 8

E-COMMERCE SYSTEM, METHOD AND COMPUTER PROGRAM PRODUCT

FIELD OF THE INVENTION

The present invention relates to business-to-business (B2B) frameworks, and more particularly to procuring business in an e-commerce environment.

BACKGROUND OF THE INVENTION

As businesses seek to grow and expand, they encounter the predictable costs of acquiring new customers or business. The cost of maintaining a sales force, marketing functions and ongoing promotions are significant. These acquisition costs generally affect all businesses, regardless of industry. Similar costs are incurred by businesses attempting to purchase goods and services. Processing, selecting, screening, and awarding contracts contribute to the growing administrative cost of doing business.

Technological advances have allowed many business to conduct business via electronic communication mediums. Such business may take the form of bidding systems, virtual stores, etc. By way of this use of technology, costs associated with business have been greatly reduced. Further, many additional techniques have been developed to enhance the manner in which business is carried out.

For example, U.S. Pat. No. 4,789,928 issued to Fujisaki on Dec. 6, 1988 describes an auction information transmission processing system constructed by connecting a most significant front computer to a host computer, arranging at least one stage of a plurality of intermediate front computers and a plurality of least significant front computers so as to be connectable to the most significant front computer in a tree-like configuration via communication lines, and arranging a plurality of dealer terminals so as to be connectable to each of the least significant front computers via communication lines. Each of the dealer terminals has basic pattern data storage means storing pattern data indicative of basic display screen pictures and exhibit data storage means storing data peculiar to articles on exhibit at an auction. When the system is started up, the host computer transmits a line connection signal to the front computers. After bidding starts, each of the front computers, in response to a command from the host computer, selects a predetermined number solely of bid-up signals from each of the dealer terminals and transmits these signals to a front computer. The most significant front computer selects only a predetermined number of bid-up signals and bids up the price of an exhibit being auctioned. After a pledge to buy an exhibit is made, the least significant front computers identify pledging members based on the member registration data, and data indicative of these members are transmitted to the front computers of higher significance.

Another computerized bidding system is disclosed in U.S. Pat. No. 4,903,201 issued to Wagner on Feb. 20, 1990. Wagner describes a computerized open outcry exchange system for transacting sales of a particular futures commodity contract by members of a futures trading exchange wherein bids to purchase or offers to sell the particular commodity contract are made by the members through remote terminals and the exchange computer automatically matches offers and bids to complete the transaction.

A teleprocessing system used by QVC Incorporated is described in an article entitled "Fashion Re-Evaluates Flickering Fortunes of TV Home Shopping", WWD, Nov. 8, 1995 V170 N87. Shoppers call from their home phones to order items advertised on their television screens. As the orders are received, QVC tallies how many people have bought each particular sale item. QVC then displays the tally for each item on the viewers' television screens in real-time. This interactive television method of buying an item provides easy remote access to a sale and real-time feedback to customers. Unfortunately, it also requires each home shopper to pay for items individually, so that the sale is limited to relatively low cost items.

In addition to the auctions mentioned above, several other on-line auctions are now being conducted over the Internet. One such auction is described in an article entitled "Cathay Pacific Airways-USA to Hold First Ever Internet CyberAuction" Business Wire, Sep. 26, 1995 p9261084. The article states that Cathay Pacific is auctioning off fifty business class seats from Los Angeles to Hong Kong. Registered bidders submit concealed bids by electronic mail over a two week bidding session. The fifty highest bidders at the close of the bidding session receive an electronic mail message instructing them on how to purchase tickets.

Auction Web also has on-line auctions, as described at their world-wide web site http://www.ebay.com. In this auction system, bidders also register and submit bids through the Internet. Items for sale are graphically displayed on the bidders' screens, in addition to the bid information for each item. Bid information is updated hourly throughout each two week bidding session. Similarly, Christie's International describes "Results of the World's First On-Line Auction" at their worldwide web site http://www.christies.com. In Christie's auction, bidders register and submit bids in the same manner as the Auction Web auction.

DISCLOSURE OF THE INVENTION

A system, method and computer program product are provided for e-commerce. In use, a plurality of suppliers are registered. In addition, goods-related information from customers is received, where the goods-related information is associated with goods. Access to the goods-related information by the suppliers is allowed utilizing a network. Further, offers relating to the goods from the suppliers are received utilizing the network, and the customers are informed of the offers. Still yet, a guarantee is provided to the customers regarding a qualification of at least one supplier with respect to a provision or fulfillment of the offer received therefrom. Such guarantee is provided as a function the at least one supplier or at least one action thereof.

BRIEF DESCRIPTION OF THE DRAWINGS

FIG. 6 is a flowchart illustrating the auction manager and its method of operation;

FIG. 8 is a flowchart illustrating the electronic mail messenger and its method of operation;

DESCRIPTION OF THE PREFERRED EMBODIMENTS

Figure 1:
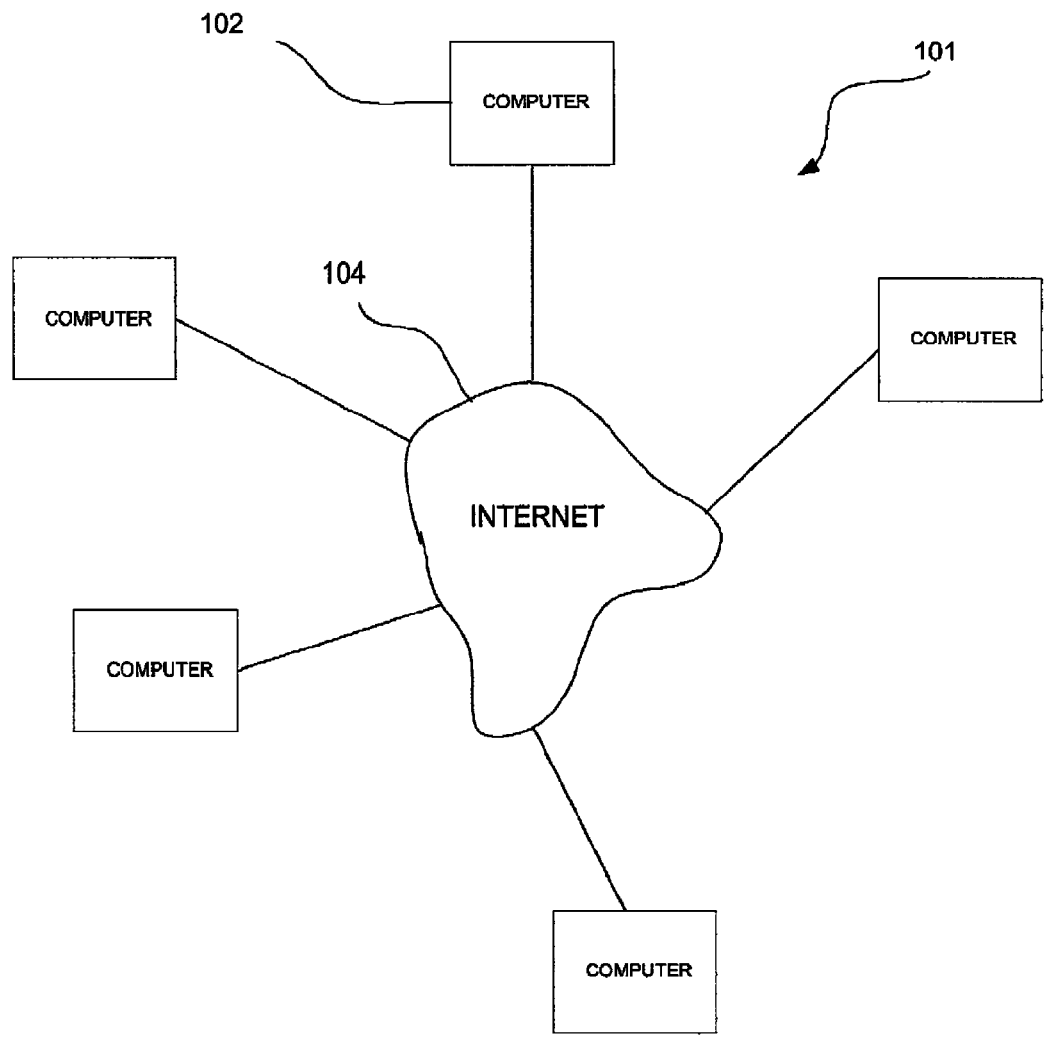
FIG. 1 illustrates an exemplary environment in which the present invention may be implemented.

FIG. 1 illustrates an exemplary environment 101 in which the present invention may be implemented. As shown, a plurality of computers 102 are interconnected via a network 104. In one embodiment, such network includes the Internet. It should be noted, however, that any type of network may be employed, i.e. local area network (LAN), wide area network (WAN), etc.

Figure 2:
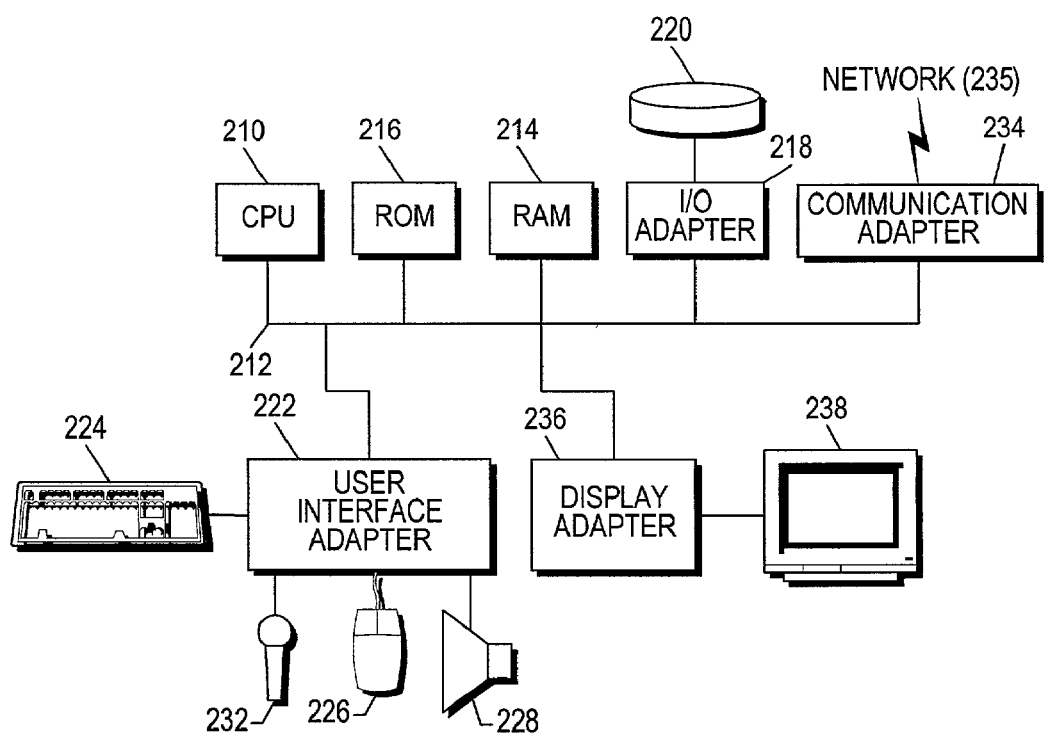
FIG. 2 shows a representative hardware environment associated with the computer systems of FIG. 1.

FIG. 2 shows a representative hardware environment associated with the computer systems 102 of FIG. 1. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of Control. A program written with the aid of class libraries is still responsible for the flow of control (i.e., it must control the interactions among all the objects created from a particular library). The programmer has to decide which functions to call at what times for which kinds of objects.

Duplication of Effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small-scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

- Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.
- Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
- Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 3:
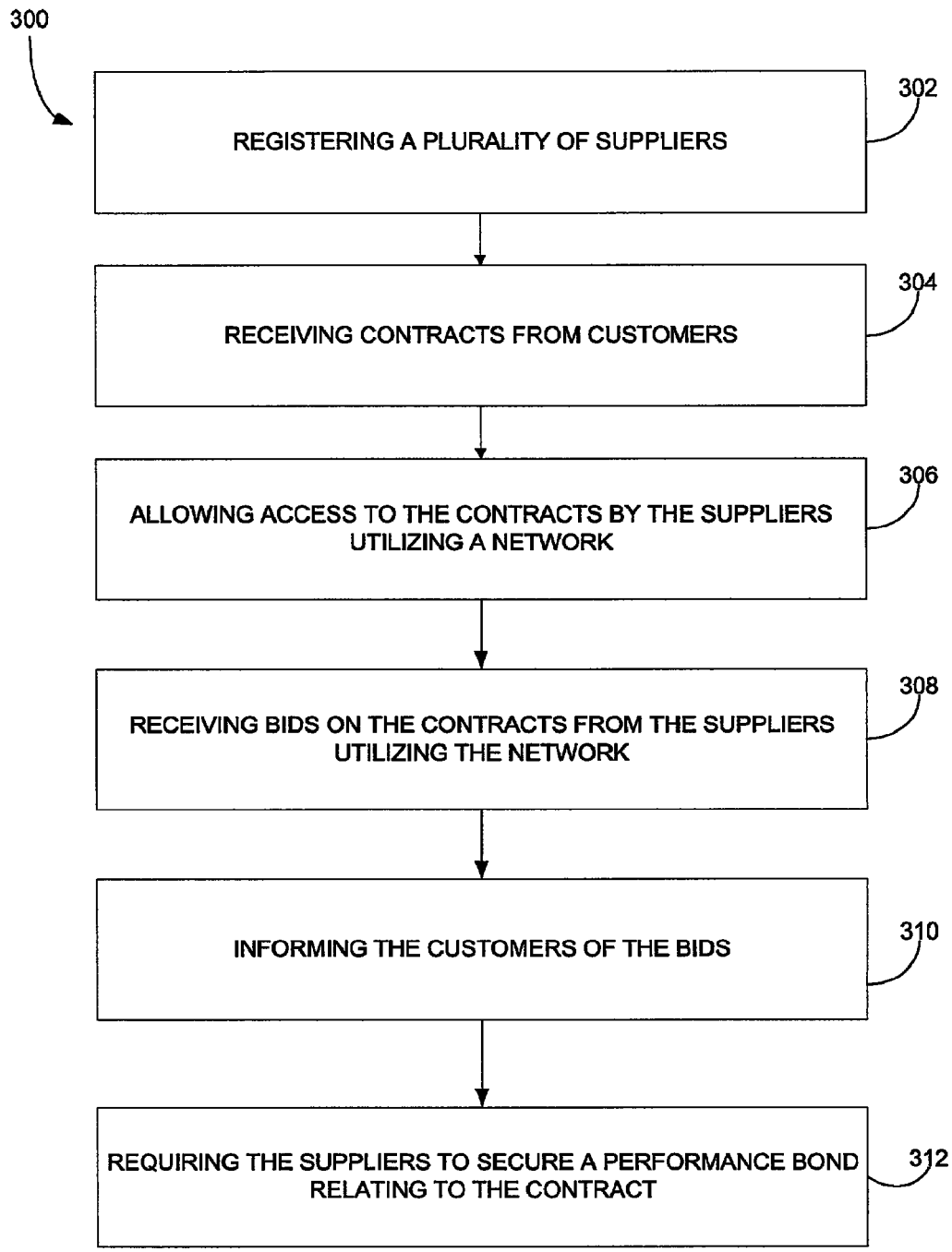
FIG. 3 illustrates a method for procuring business in a bidding type system.

FIG. 3 illustrates a method 300 for procuring business. Initially, in operation 302, a plurality of suppliers is registered. In particular, profiles may be maintained on perspective suppliers. Registration may be accomplished by filling out an on-line registration form or the like. A qualification process may also be executed to ensure the integrity of the suppliers although the risk of forfeiture of performance bond monies is the major incentive to comply with committed obligations.

In one embodiment, a key difference between this invention and other procurement services currently available is that in this instance the supplier is bidding for the rights to fulfill a contract and not necessarily directly for the actual contents or components of the contract. In this embodiment, the amount bid may or not be related to the actual cost of the units or total value of the goods or services being delivered as required by the buyer. The bid amount is more aligned with the expected cost of sales prospecting, contract negotiation, and the risks associated with the competitive bidding that occurs when an RFI/RFP exercise is being pursued by a plurality suppliers.

In operation 304, contracts are received from customers. Such contract may be for an order for goods or services. Again, a standard on-line form may be filled out by the customers (buyers of the goods and/or services) to accomplish this. The business logic (unique to this invention) ensures that contracts are appropriately qualified, categorized and cataloged.

The suppliers are subsequently allowed to access the contracts utilizing a network (i.e. Internet), as indicated by operation 306. This may be accomplished by sending emails, posting the contracts on an electronic bulletin board, a PDA, a cell-phone, a PSTN attached device such as touch tone or voice activated command enabled telephone, etc. Such contracts may represents a specific work order for a set of goods, services, and resources that must be fulfilled within a defined time frame by the pre-qualified suppliers at a specific price that meets the needs of the customer.

As such, bids on the contracts may be received from the suppliers utilizing the network. See operation 308. Such bids may be received by an electronic mail message, call center system, on-line form, etc.

Further, in operation 310, the customers are informed of the bids so that the bids may be accepted. As an option, the present embodiment may automatically notify the customers when a supplier bids for their business. Again, this may be accomplished by sending emails, postings on an electronic bulletin board, etc. The transaction may thus be carried out with both privacy and security.

Still yet, the suppliers secure a performance bond relating to the contract for reducing the risk of non-performance by the supplier. See operation 312. As such, all suppliers that want to participate in the exchange are required as defined in the work order to secure a performance bond. Should the supplier fail to perform, the bond will be cashed and the proceeds passed on to the customer to reimburse for any inconvenience suffered. As such, the bonds ultimately reduce the risk of nonperformance by the supplier.

As an option, payment of an "Acquisition Fee" may be received from the suppliers for the cost of acquiring the business. As an option, the payment may be based on a percentage of price-related terms and conditions of the contract. The "Acquisition Fee" generally may also be some fraction of the costs associated with securing similar contracts had the present exchange medium not existed.

To provide an incentive to use the present invention, the customers may receive a portion of the payment received from the suppliers. This may be a certain percentage of the payment, a graduated flat fee, or the like.

To generate further revenue, payment of a "Posting fee" may also be received from the customers. Similar to the payment received from the suppliers, the present customer fee may be based on terms and conditions of the contract.

The present system thus offers significant economic benefits to traditional procurement models. For example, the present invention is capable of producing incremental revenue to customers from their percentage of the "Acquisition fee". Customers can save money in qualifying and securing suppliers of their needed goods or services. Moreover, suppliers benefit by gaining access to incremental business channels at a low cost. Further, customer service is guaranteed through performance bonds. Still yet, the present exchange process is transparent once the contract is delivered, thus affording the supplier the opportunity to manage his or her own customer service.

The present invention thus offers a new, low cost, confidential, and guaranteed method for conducting B2B procurement that will not only speed up the overall process, but afford the customer with incremental revenue each time he or she acquires goods or services from any pre-qualified supplier.

In one embodiment of the present invention, the following optional steps may be performed:
   (a) Registering a plurality of suppliers per category managed by an electronic "Rules driven" profile detailing delivery capability and business terms which can be supported and accepted by each supplier.
   (b) Receiving contracts from customers both electronically via some network infrastructure or manually via a people intensive process.
   (c) Standardizing the contracts to create a generic representation of the goods or services to be delivered or performed, enabling ease of comparison.
   (d) Allowing access to the contracts by the suppliers utilizing a secure personalized profile driven network accessible via the internet and other public communications infrastructures globally.
   (e) Receiving bids on the contracts from the suppliers utilizing the network accessible via the internet and other public communications infrastructures globally.
   (f) Informing the bidders and customers of the bids via an electronic personalized notification system.

(g) Reducing the costs of acquisition and purchase of goods or services to a customer by sharing the revenues generated via the exchange with the exchange operator.

(h) Reducing the cost of sales of products and services by quantifying the and defining the costs associated with securing a contract using the exchange's capabilities.

(i) Requiring the suppliers to secure a performance bond relating to the contract to ensure maximum incentive to fulfill commitment to supply goods or services.

(j) Guaranteeing the customer a qualified (meets price, delivery time and quality criteria) supplier for the provision/fulfillment of the goods or services required.

In another embodiment of the present invention, the aforementioned contract may take the form of an order for goods or services. The suppliers are subsequently allowed to access the contracts utilizing a network. This network may be a internet or PSTN accessible using a computer terminal wireless or wired via a narrow/broadband connection. The information may be accessed using the DTMF touch tone keys on a regular telephone or via voice commands over a wireless or wired telephone without any special modification to the device being used for access. All the necessary information translation to support the plethora of access terminal devices is performed by the invention as part of the network intelligence. As such, bids on the contracts may be received by the exchange from the suppliers utilizing the network. Further, the customers are informed by the exchange of the winning bids that have been accepted by the exchange so that the contract fulfillment process may begin. Still yet, the suppliers secure a performance bond relating to the contract for reducing the risk of non-performance by the supplier. In the event that a bidder is unable to perform or fulfill its obligations, the performance bond is forfeited to the exchange and the second place bidder is awarded the contract after a performance bond has been posted and received from the new winner by the exchange.

The bidders may prevented from intentionally bidding up the contracts to either drive their competitors out of business or increasing the cost of the winning bidder by two methods (1) Financial disincentive approach levies an incremental non refundable bidders fee per transaction so that each time a bid is made and accepted a modest but significant fee is charged to the bidder; the winning bidder has this fee credited against the contract purchase fee. (2) Technical credit level and heuristic behavioral modeling algorithm is used monitor bidding and purchasing patterns; when a phony bid is received although a bid may be accepted the bidder may be automatically disqualified after a series of warnings to cease and desist the unauthorized bidding behavior.

Figure 4:
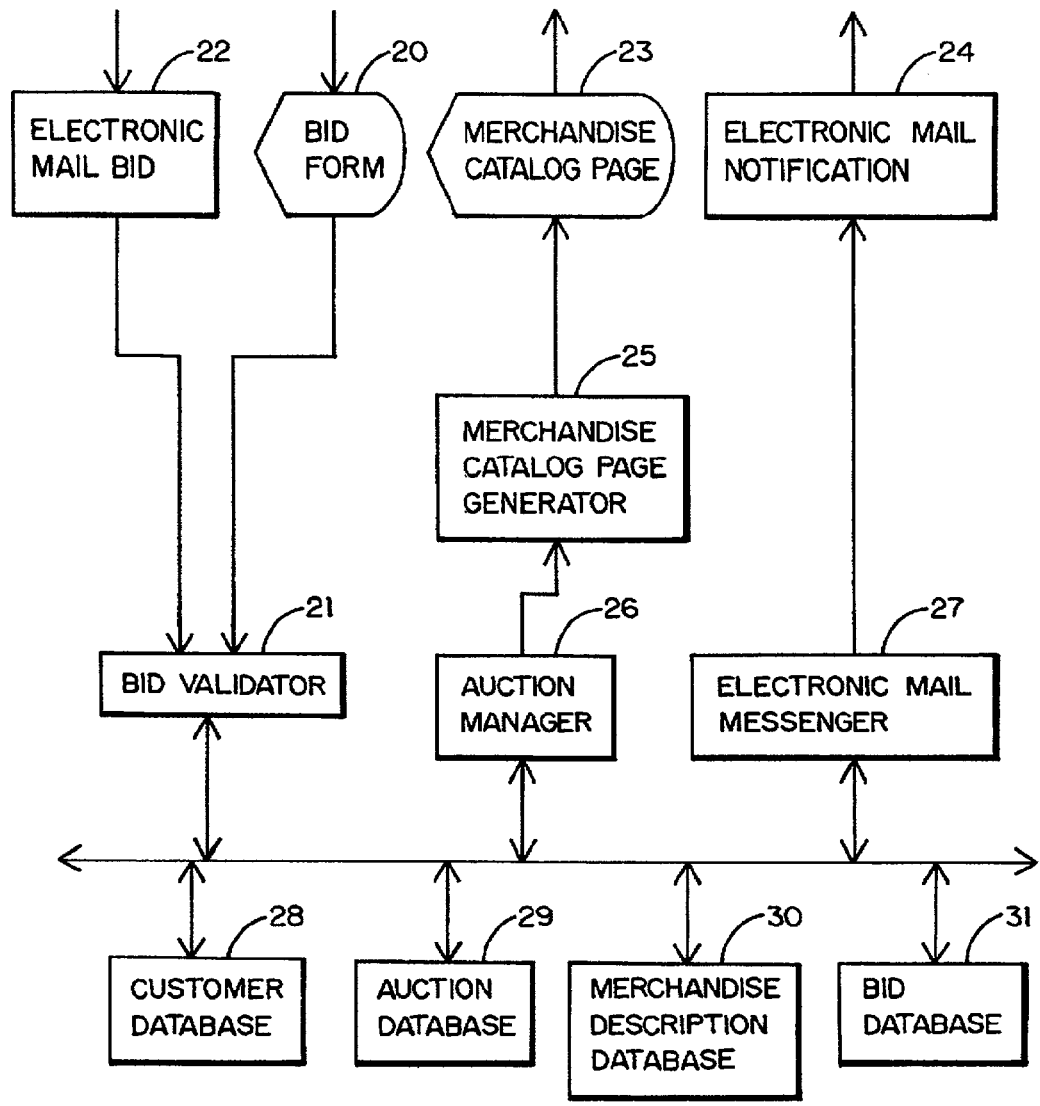
FIG. 4 is a block diagram of components illustrating one exemplary environment in which the present invention may be implemented.

A bidding system in which the foregoing concepts may be utilized will now be set forth. It should be noted that the following example is merely illustrative in nature, and should not be construed as limiting in any manner. FIG. 4 illustrates a high level block diagram of the electronic auction system of the present invention. As shown, information from bid form 20 is received by the electronic auction system where it is processed by bid validator 21. Bid validator 21 examines the bid information entered by the customer on bid form 20 to ensure that the bid is properly formatted, all necessary data is present, and the data values entered look credible. Exemplary functions of bid validator 21 include verifying credit card information entered by the customer, checking that a complete name and shipping address has been entered, that the proper state abbreviation and zip code have been entered, that an appropriate bid amount has been entered, and that a telephone or facsimile number has been entered. Once the bid information has been validated, the bid validator 21 places the bid in bid database 31.

Auction manager 26 preferably frequently queries the bid database 31 to see if any new bids have been placed. If new bids are found during the query, then auction manager 26 calculates the current high bidder or bidders and instructs merchandise catalog page generator 25 to regenerate a catalog page with the updated bid information.

Auction manager 26 is also responsible for opening and closing auctions. This entails making merchandise lots available for bidding by customers and disabling their associated buy or bid features on the merchandise pages that have been posted to potential bidders but have closed. When auction manager 26 determines that a new lot should be opened for bidding or an available lot should be closed, it instructs merchandise catalog page generator 25 to create or update the merchandise catalog pages for the appropriate lots.

Electronic mail messenger 27 frequently queries bid database 31 for bids recently marked by auction manager 26 as having been outbid or as having won an item in a recently closed auction. If such bids are found, the electronic mail messenger 27 formats an appropriate electronic mail notification message 24 and sends this message to the customer. Many customers read their electronic mail throughout the day, making this a convenient mechanism for keeping them informed about the status of merchandise on which they are actively bidding. Bidders may reply to an electronic mail notification message 24 informing them that they have been outbid by including an increased bid amount in the reply message. An electronic mail bid 22 sent in reply to the notification is received by the electronic auction system and processed by bid validator 21 as described above.

Figure 5:
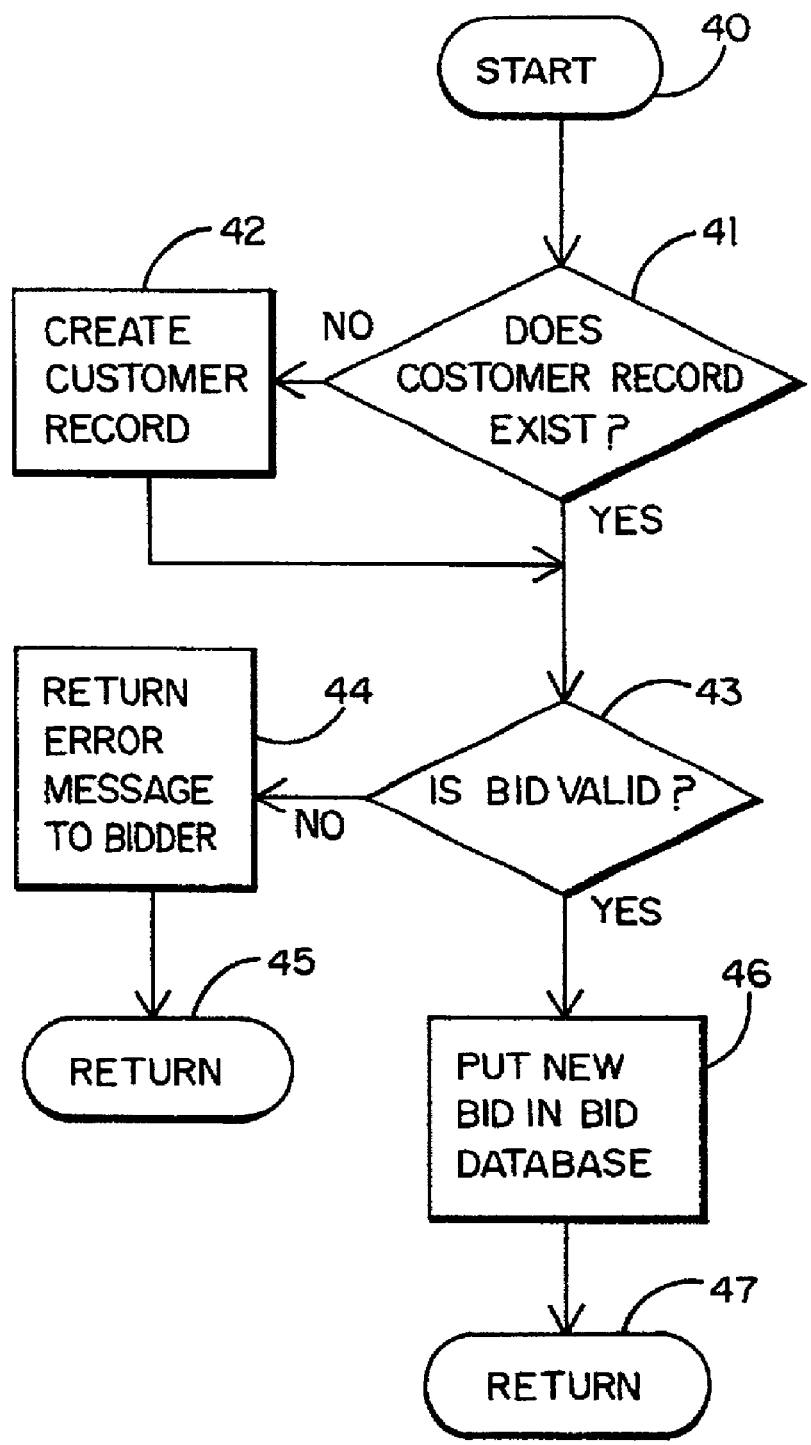
FIG. 5 is a flowchart illustrating the bid validator and its method of operation.

FIG. 5 illustrates in detail the procedure of bid validation as accomplished by bid validator 21 shown in FIG. 4. A bid is received by bid validator 21 and the customer is looked up at step 41 in customer database 28. If no customer record exists for the customer then a new customer record is created 42 and placed in customer database 28. From there, the bid information is validated 43 as previously described. If the bid data includes one or more errors, then an error message is returned 44 to the bidder, preferably in the form of a well-formatted page posted across the network, itemizing the errors found in the bid. If the bid is valid, as found in step 43, then the bid is placed 46 in bid database 31.

FIG. 6 provides a detailed illustration of the procedures carried out by auction manager 26. Auction manager 26 is preferably a continuously running system that begins by getting the current time as at step 51. It then checks to see if any new items for sale are to be opened by examining the merchandise database to see if any new merchandise items are scheduled to be made available for bidding by customers at or before the current time. An operator, or some automated substitute, may upload merchandise and scheduling information to the database, as shown in FIG. 2. If new merchandise items are scheduled for posting, these items are opened for bidding 52. The auction manager then examines the merchandise database to see if any merchandise items are scheduled to be closed from customer bidding. If so, these items are closed from bidding 53. Auction manager 26 then examines the merchandise database to see if any merchandise items posted with a price markdown feature are scheduled to have their prices adjusted. If so, the prices of these items are adjusted 54 in accordance with the particular item's price adjustment parameters. Such parameters may include bidding activity over time, amount of bids received, and number of items bid for. Auction manager 26 then updates 55 the bid list for open items by recalculating the current high bidder list and regenerating the merchandise catalog pages 56 to reflect these new bids. This step is more fully described below with reference to FIG. 7.

Figure 7:
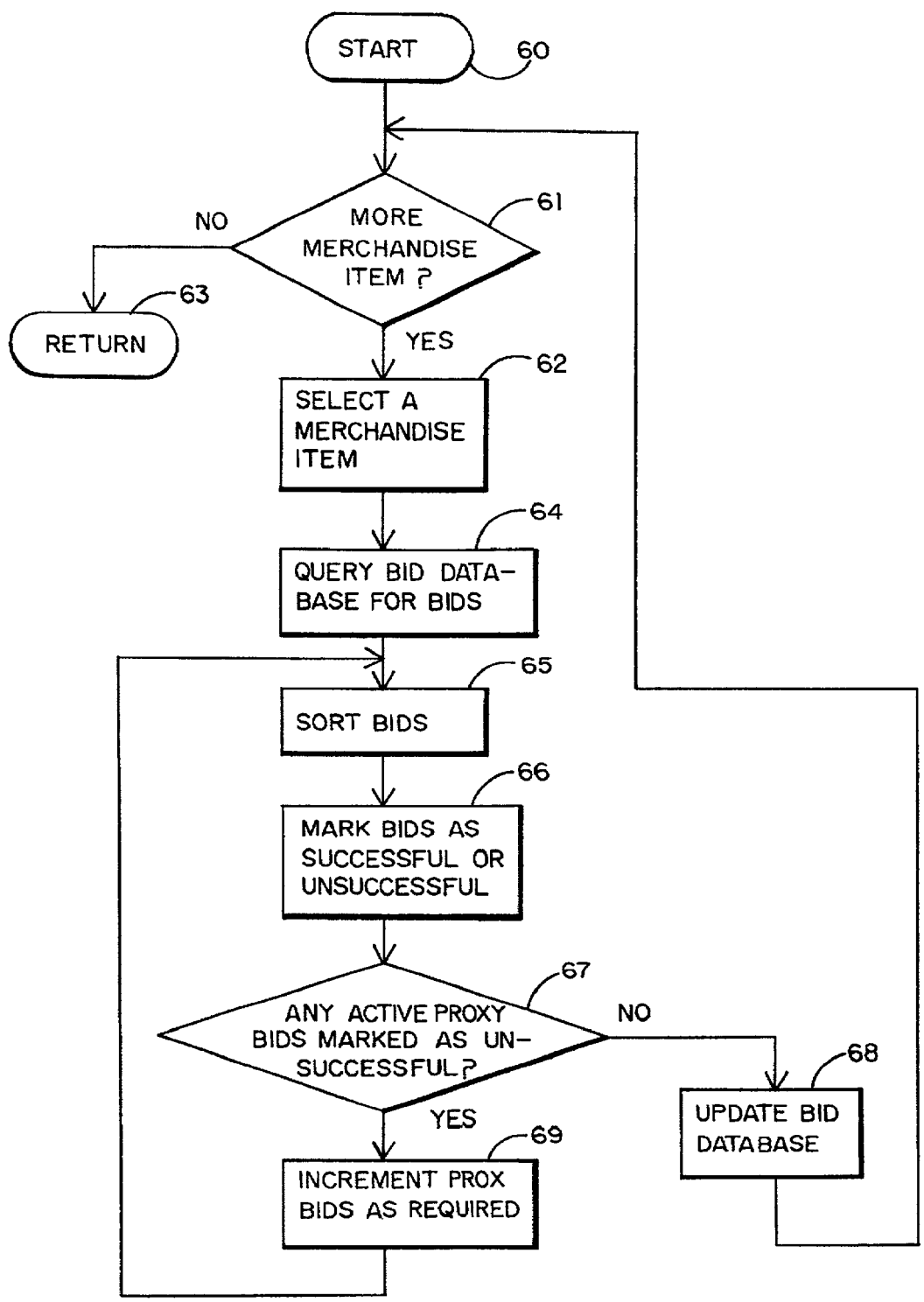
FIG. 7 is a flowchart illustrating the bid manager and its method of operation.

FIG. 7 illustrates the procedures carried out by the bid manager in updating the bid list for open items 55 as shown in FIG. 6. The bid manager begins by checking 61 if there are more merchandise items to be processed. If such items are found, the bid manager selects 62 a merchandise item to process and queries 64 the bid database for bids for this item. These bids are sorted 65 using a variety of different priority ranking schemes depending upon the auction method and system used for the particular merchandise item, as described in more detail below. Then, the bids are marked 66 as either successful or unsuccessful depending upon the bid price of the respective bids and the quantity of the item being bid on relative to the quantity of the item being auctioned. In a preferred embodiment, a quantity of an item may be put up for auction, and individual bidders may bid on any quantity of the item desired, up to the quantity of the item being auctioned.

The bid manager then checks 67 to see if there are any active proxy bids marked as unsuccessful. A proxy bid is a special bid type that allows auction manager 26 to automatically bid on the bidder's behalf up to a limited amount established by the bidder when his or her initial bid is placed. The auction manager will increase the bid as necessary up to the limit amount. This feature allows the customer to get the lowest possible price without exceeding a limit preferably established when the bid is entered. If there are active proxy bids marked as unsuccessful, then the bid manager increments 69 the proxy bids by a preset bid increment. This procedure of sorting 65 marking 66 bids and incrementing 69 the proxy bids as required continues until either there are no additional proxy bids marked as unsuccessful or the proxy limits have been reached on the proxy bids. At this point, bid database 31 is updated 68 with the marked bids. This process is then repeated for each merchandise lot open at the current time for bidding by customers.

FIG. 8 illustrates the procedures carried out by electronic mail messenger 27 which notifies bidders when they have been outbid. When marked bids are updated in bid database 31 as shown in FIG. 7, electronic mail messenger 27 detects 81 the presence of these marked bids and then looks up 82 the customer's electronic mail address and looks up 83 inventory information on the item desired by the bidder. With this information, electronic mail messenger 27 constructs 84 an electronic mail message informing the bidder that he or she has been outbid. Once constructed, the electronic mail notification message 24 is sent to the bidder as shown at step 85.

One skilled in the art to which the present invention pertains will recognize that the various components of the electronic auction system can communicate between themselves in a variety of ways. In a preferred embodiment, bid validator 21, auction manager 26, and electronic mail messenger 27 communicate by adding, marking, and updating records in the various databases. Each of these components periodically checks at least one of the databases to see if anything relevant to their respective functions has changed and take action accordingly. However, the components could send direct messages between themselves or call each other by means of program subroutines to signal important events that would require one or the other component to update its state.

One skilled in the art to which the present invention pertains will further recognize that a variety of different auction formats may be implemented using the basic technique described above. The simplest is the "Standard Auction" format, whereby the electronic auction system awards the merchandise to the top bidder or bidders in accordance with their bids once bidding has stopped. Using this format, if there is a plurality of a specific item, the system awards the merchandise to the top bidders. Bidders may bid on more than one unit, and different successful bidders will, in general, pay different prices for an item.

Figure 9:
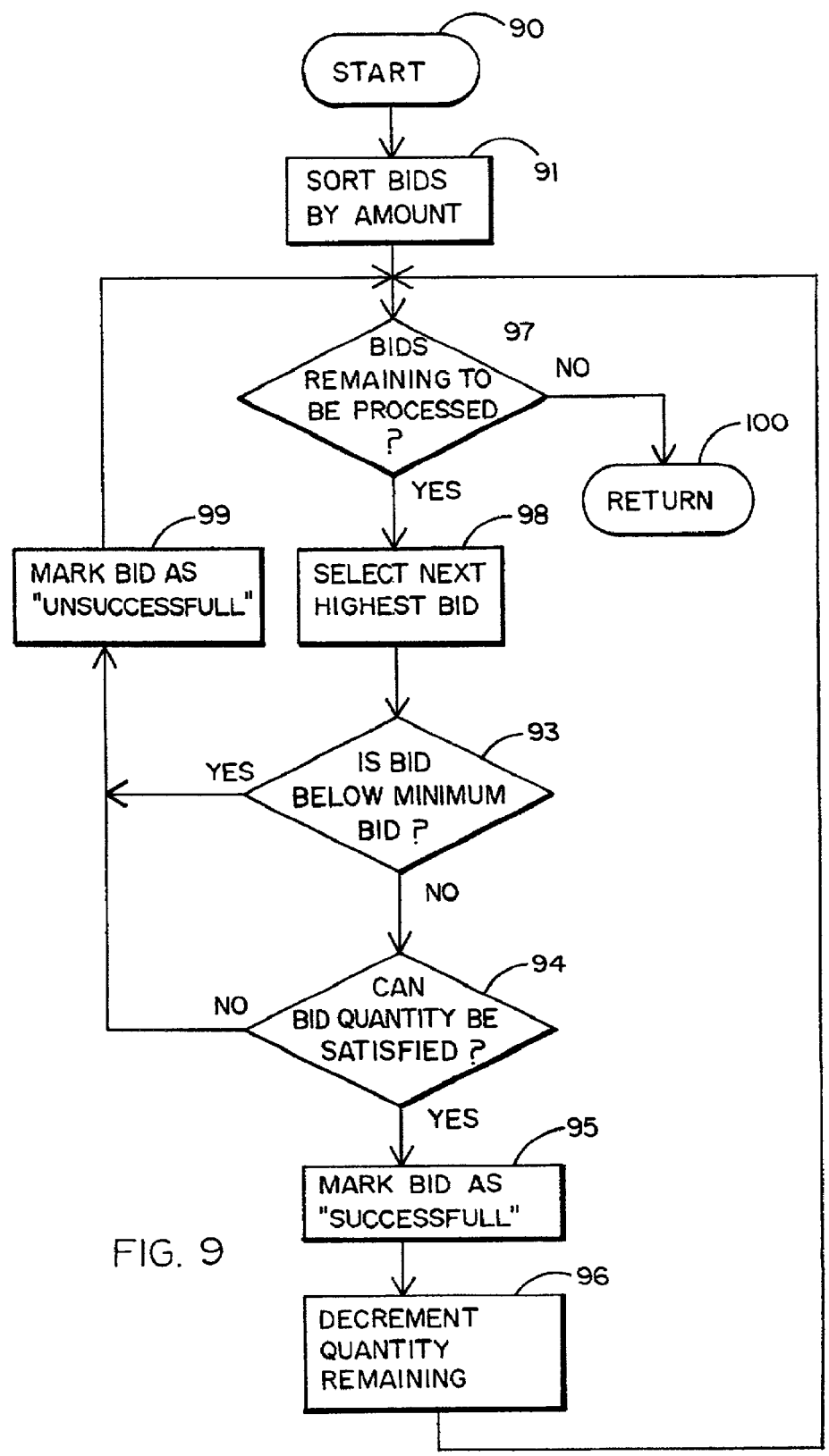
FIG. 9 is a flowchart illustrating the standard auction format and its method of operation.

FIG. 9 illustrates the Standard Auction format where bid manager 55, shown in FIG. 6, determines which bids to mark as successful or unsuccessful, as shown in step 66 in FIG. 7. Bid manager 55 begins by sorting 91 the bids by amount of the bid. If there are bids remaining to be processed, determined at step 97, the highest remaining bid is selected 98 to be checked. If the bid is below the minimum bid allowed for the particular merchandise item, as determined at step 93, the bid is marked 99 as unsuccessful. If not, the bid is checked 94 to see if the quantity may be satisfied. A bid may be satisfied if the quantity of the item bid upon is available. This information is available from auction database 29. If not, then the bid is marked 99 as unsuccessful. Optionally, the system could ask the user if a lesser quantity than bid upon will be acceptable. If the bid quantity can be satisfied, as determined at step 94, then the bid is marked 95 as successful and the item quantity remaining, recorded in auction database 29, is decremented 96 by the bid quantity. After the quantity remaining is decremented 96, and if, as determined at step 97, there are still bids remaining to be marked, the next highest bid is selected 98 and the steps of FIG. 9 are repeated.

The electronic auction system of the present invention also provides a "Dutch Auction" format, wherein the electronic auction system awards the merchandise to all of the top bidders for whom there is available inventory at the price bid by the lowest successful bidder. This format may be preferred by customers for being the most fair when a plurality of a specific item is being auctioned. As with all bidding, there will be a range of bids submitted. In the Dutch Auction format, the highest bidders are awarded the merchandise but at the same price for all successful bidders, the price bid by the lowest successful bidder.

Figure 10:
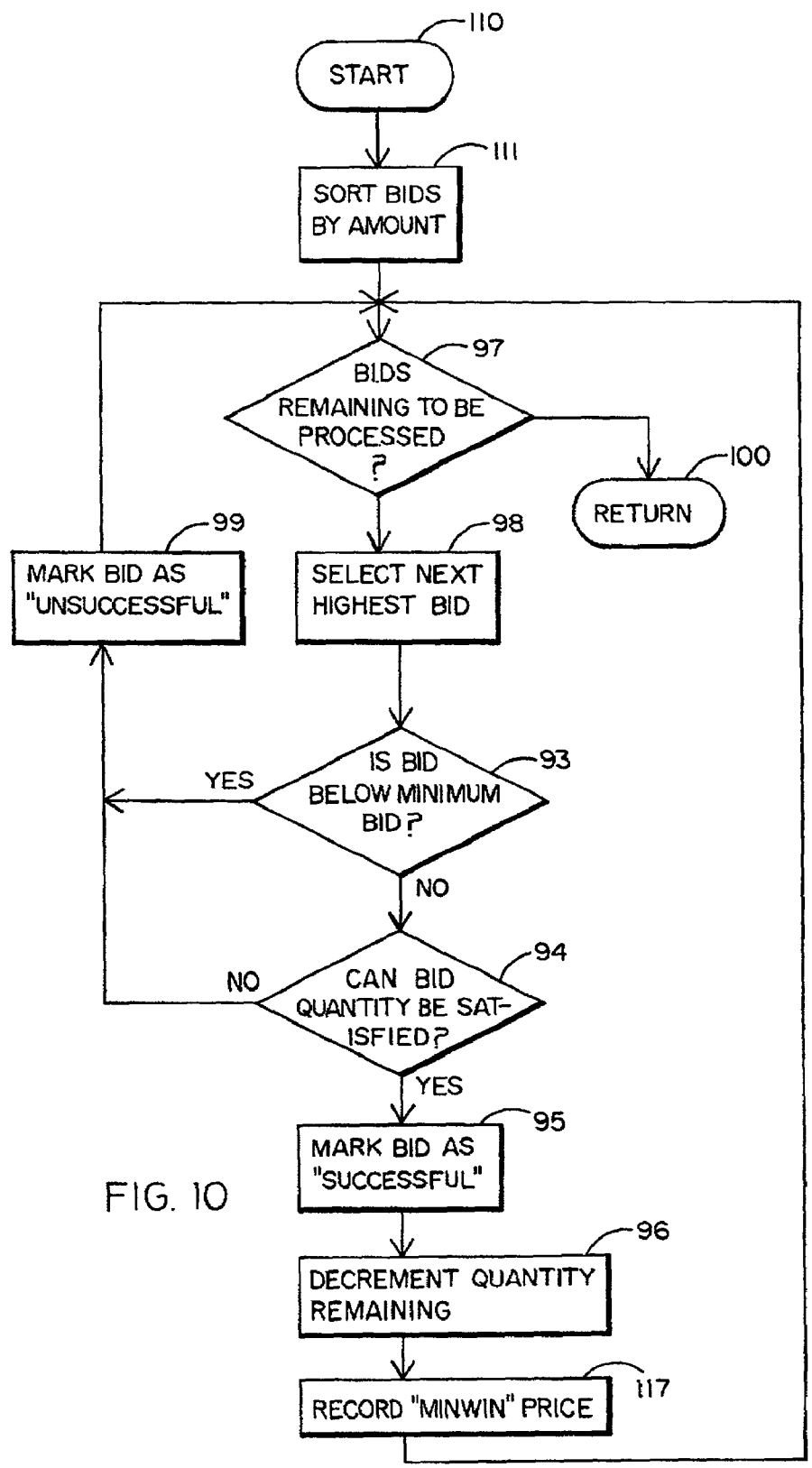
FIG. 10 is a flowchart illustrating the Dutch auction format and its method of operation.

FIG. 10 illustrates the Dutch Auction format whereby bid manager 55 shown in FIG. 6 determines which bids to mark 66 as successful or unsuccessful, as shown in FIG. 7. Bid manager 55 begins by sorting 111 the bids by amount of the bid. If there are bids remaining to be processed, as determined at step 97 the highest bid is selected 98 to be checked. If the bid is below the minimum bid allowed for the particular merchandise item, as determined at step 93, the bid is marked as unsuccessful 99. If not, the bid is checked 94 to see if the bid quantity may be satisfied. If the bid cannot be satisfied, then the bid is marked as unsuccessful at step 99. If the bid quantity can be satisfied, then the bid is marked as successful at step 95 and the item quantity remaining is decremented 96 by the bid quantity. At this time the MinWin price is recorded 117. The MinWin price is the price above which a new bidder must bid in order to be successful in the Dutch Auction format were the auction to close at that moment. The MinWin price is, in general, the bid price of the lowest bid that is marked as successful. After recording the MinWin price at step 117, where there are still bids remaining to be marked, as determined at step 97, the next highest bid is selected 98 and the steps of FIG. 10 are repeated.

The electronic auction system of the present invention also includes a "Progressive Auction" format, wherein the electronic auction system awards the merchandise to the top bidders based on price bid. As with the Dutch Auction format, the highest price bids are awarded the merchandise up to the quantity available of the item being auctioned. However, unlike the Dutch Auction format, the system awards the merchandise to the successful bidders at different prices depending on the quantity bid. In a preferred embodiment, a successful bidder for a single unit of an item is awarded the item at the price of the lowest successful bid for a single unit of the item. A successful bidder for a higher quantity of the same item is awarded the item at the price of the lowest successful bid at that quantity or any lower quantity. For example, a successful bidder for a quantity of five would pay the lowest price for any successful bid for quantity one through five of the item. The price paid for a given quantity is termed the "MinWin" price for that quantity. The Progressive Auction format ensures that successful bidders for a quantity of an item pay the lowest price paid by any other successful bidder at that quantity level or below. Use of this format leads to lower prices for those who successfully bid on larger quantities of an item, provides an impetus for volume buying, and therefore leads to greater sales volume.

Figure 11:
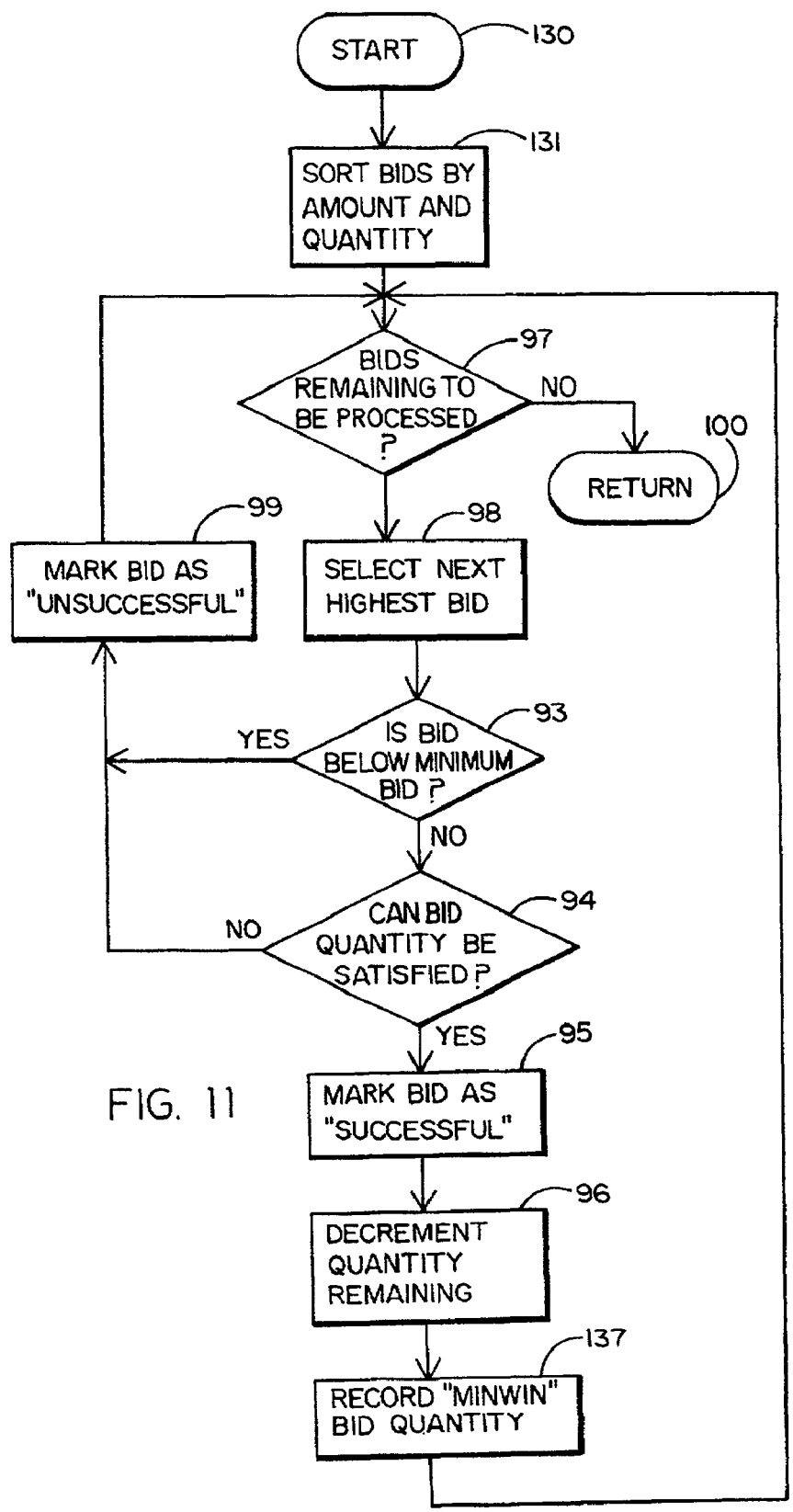
FIG. 11 is a flowchart illustrating the progressive auction format and its method of operation.

FIG. 11 illustrates the Progressive Auction format, wherein bid manager 55 shown in FIG. 6 determines which bids to mark as successful or unsuccessful 66 as shown in FIG. 7. Bid manager 55 begins by sorting 131 the bids by amount of the bid. If there are bids remaining to be processed, as determined at step 97, the highest bid is selected 98 to be checked. If the bid is determined to be below the minimum bid allowed for the particular merchandise item at step 93, the bid is marked as unsuccessful 99. If not, the bid is checked at step 94 to see if the bid quantity can be satisfied. If not, then the bid is marked 99 as unsuccessful. If the bid quantity is checked and found to be satisfied at step 94, then the bid is marked as successful 95 and the item quantity remaining is decremented 96 by the bid quantity. The MinWin price is then recorded 137. The MinWin price is the price above which a new bidder must bid in order to be successful in the Progressive Auction format were the auction to close at that moment. The MinWin price is, in general, the bid price of the lowest bid at the current bid quantity or lower that is marked as successful. After recording the MinWin price 137, if there are still bids remaining to be marked, the next highest bid is selected 98 and the steps of FIG. 11 are repeated.

The electronic auction system also includes a "Buy Or Bid" format wherein the electronic auction system awards merchandise to bidders who place bids at or above a posted selling price. The item remains for sale until the available quantity is purchased. Bids that are below the posted selling price are maintained in reserve by the system. If a certain sales volume is not achieved in a specified period of time, the electronic auction system automatically reduces the price by a predetermined amount or a predetermined percentage of the price and updates the merchandise catalog page accordingly. The lower price may be at or below some of the bids already in the bid database. If such bids are present, they are then converted to orders and the quantity available is reduced accordingly. Similarly, if a certain sales volume is exceeded in a specified period of time, the electronic auction system automatically increases the price by a set amount or by a set percentage of the price and updates the merchandise page accordingly. These automatic price changes allow the seller to respond quickly to market conditions while keeping the price of the merchandise as high as possible to the sellers benefit.

Figure 12:
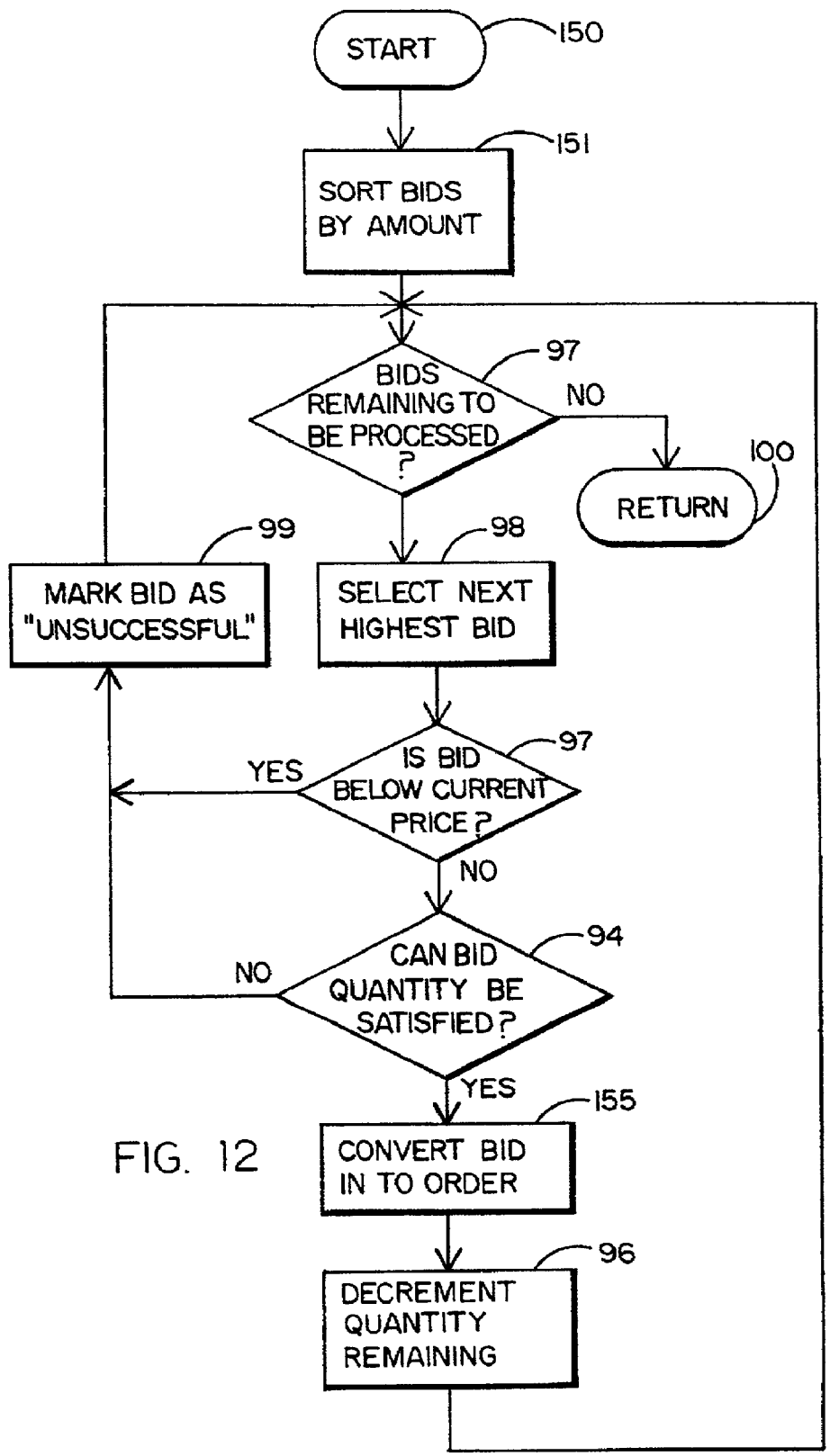
FIG. 12 is a flowchart illustrating the buy or bid sale format and its method of operation.

FIG. 12 illustrates the Buy Or Bid format whereby bid manager 55, as shown in FIG. 6, determines which bids to mark as successful or unsuccessful 66, as shown in FIG. 7. Bid manager 55 begins by sorting 151 the bids by amount. If there are bids remaining to be processed, as determined at step 97, the highest bid is selected 98 to be checked. If the bid is below the current price of the merchandise item, as determined at 93, then the bid is marked 99 unsuccessful. If the bid is not below the current price, as determined at 93, then the bid is checked 94 to see if the bid quantity can be satisfied. If not, the bid is marked as unsuccessful 99. If the bid quantity can be satisfied, then the bid is converted into an order 155 at the current price of the item and the item's quantity remaining is decremented 96. The bids remaining to be processed, as determined at 97, are then checked and the steps of FIG. 11 are repeated. From time to time, the current price of the merchandise item may be raised or lowered either by manual input from an operator or by automatically using the "markdown" feature described below with reference to FIG. 14.

Figures 13, 14:
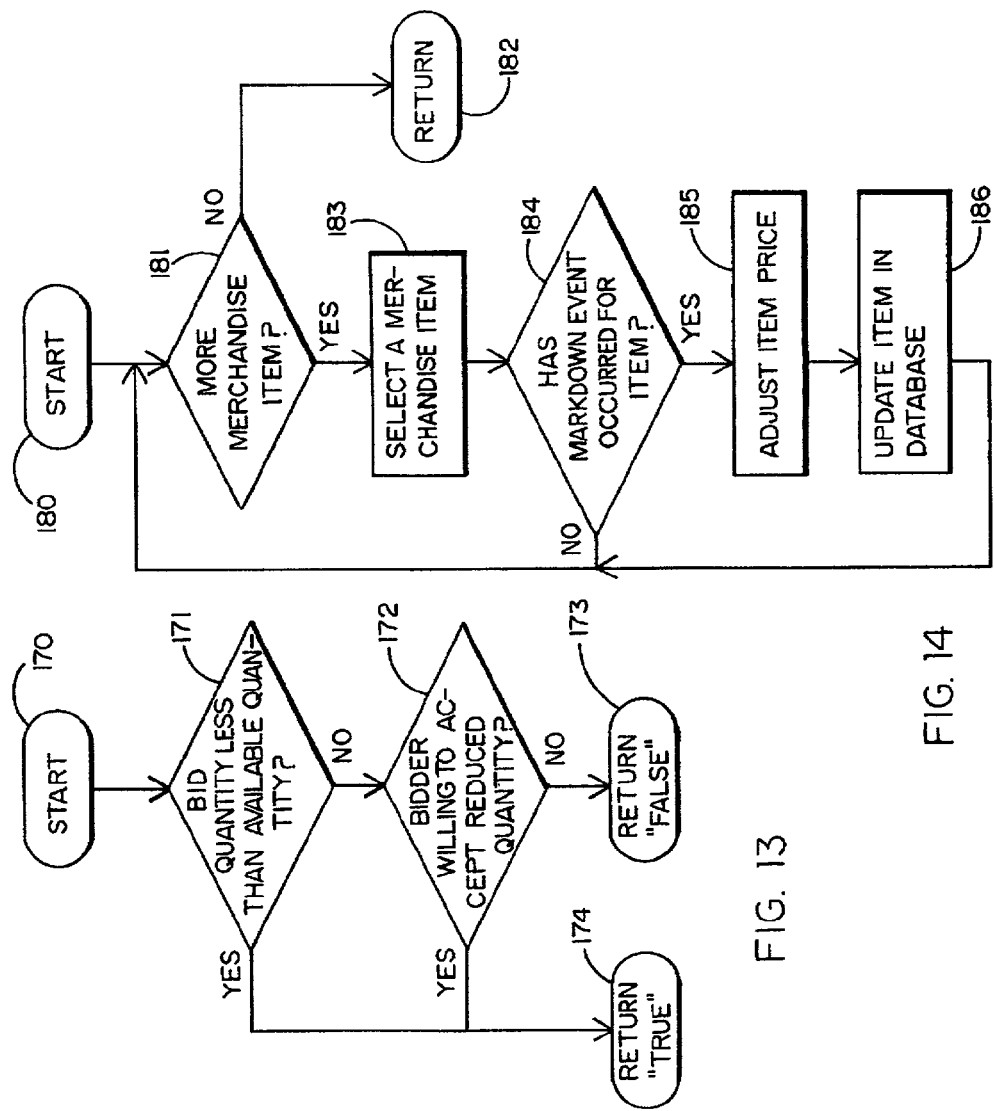
FIG. 13 is a flowchart illustrating bid quantity determination and its method of operation.
FIG. 14 is a flowchart illustrating the markdown price adjustment feature of the present invention and its method of operation.

FIG. 13 illustrates in more detail the step of determining if the bid quantity can be satisfied 94. If the bid quantity is determined to be less than the available quantity of the merchandise item at step 171, then the test is found satisfied at step 174. If not, then the bid is checked at 172 to see if the bidder is willing to accept a reduced quantity. Preferably, when placing a bid, the bidder indicates its willingness to accept a partial quantity in the event that an insufficient quantity of the item is available to satisfy the bid if successful. If the bidder is found willing to accept a reduced quantity at 172, then the test is found satisfied at 174. If not, the test fails at 173 and the bid is marked as unsuccessful at, for example, 99 in FIG. 9.

The electronic auction system also includes a "markdown" feature, wherein the electronic auction system of the present invention awards merchandise to buyers who place orders at the currently posted selling price. The item remains on sale until the available quantity is purchased. If a certain sales volume is not achieved in a specified period of time, the electronic auction system automatically reduces the price by a set amount or a set percentage and updates the merchandise catalog page accordingly. This lower price encourages buyers to take advantage of the new price. If a certain sales volume is exceeded in a specified period of time, the electronic auction system automatically increases the price by a set amount or a set percentage and updates the merchandise page accordingly. These automatic price changes allow the system to respond to market conditions while keeping the prices of the merchandise as high as possible to the seller's benefit.

FIG. 14 illustrates the Markdown price adjustment feature whereby auction manager 26, as shown in FIG. 4, periodically adjusts 54 the sales prices or minimum bid prices, of the merchandise items according to a predetermined schedule as shown in FIG. 6. If more merchandise items are found in the merchandise database at 181, a merchandise item is selected 183 for Markdown. If a Markdown event has occurred for the item, as determined at 184, the item's price is adjusted 185 according to the schedule preset for the individual item. Alternatively, the adjustment could be relative to prices offered for the merchandise. The merchandise item is then updated 186 in the database with the new sale price or minimum bid price. The steps of FIG. 14 are then repeated for each successive merchandise item in the merchandise database.

The electronic auction system of the present invention preferably includes a "Proxy Bidding" feature that may be applied to any of the auction formats described above. FIG. 7 fully describes auction manager 26 including the Proxy Bidding feature. When Proxy Bidding is employed, a bidder places a bid for the maximum amount they are willing to pay. The electronic auction system, however, only displays the amount necessary to win the item up to the amount of the currently high proxy bids of other bidders. Typically, the currently high bids display an amount that is one bidding increment above the second highest bid or bids, although a percentage above the second highest bids may be used as well. When a new bidder places a bid that is above a currently displayed high bid, the proxy feature will, in general, cause the currently high bid to move up to an amount higher than the new bid, up to the maximum amount of the currently high bidder's proxy bid. Once a new bidder places a bid in excess of the currently high bidder's proxy bid, the new bid becomes the current high bid and the previous high bid becomes the second highest bid. This feature allows bidders to participate in the electronic auction without revealing to the other bidders the extent to which they are willing to increase their bids, while maintaining control of their maximum bid without closely monitoring the bidding. Participation is engaged in automatically on the bidder's behalf by the inventive system. The feature guarantees proxy bidders the lowest possible price up to a specified maximum without requiring frequent inquiries as to the state of the bidding.

One skilled in the art to which the present invention pertains will recognize that a variety of different auction formats may be implemented in addition to those described above. One skilled in the art will also recognize that the electronic auction system of the present invention can employ a "Floating Closing Time" feature whereby the auction for a particular item is automatically closed if no new bids are received within a predetermined time interval. This feature would typically be implemented in a manner similar to that used to close auctions of old items, as shown at step 53 in FIG. 6. This feature forces the bidding activity to occur within a shorter amount of time than would otherwise be achieved because bidders are aware that the item will automatically close if no new bids have been received in a timely manner. Thus, bidders have an incentive to stay active in the bidding process to avoid closure of an item before maximum, and most potentially winning, bids have been entered. The Floating Closing Time feature also allows more items to be auctioned during a period of time since each item is closed once bidding activity ceases; the bidding period is not protracted to an artificial length as is the case when an item closes at a preset date and time. The Floating Closing Time feature of the present invention may be employed either in conjunction with or independent of a fixed closing time for an item. When employed in conjunction with a fixed closing time, the auction is closed either when the preset fixed time period has expired for the item or when no bidding activity has occurred within a preset time interval. This forces the bidding to cease at a particular time in case the bidding activity becomes artificially protracted.

A general description of the present invention as well as a preferred embodiment of the present invention has been set forth above. Those skilled in the art to which the present invention pertains will recognize and be able to practice additional variations in the methods and system described which fall within the teachings of this invention. For example, although a preferred embodiment of the present invention chooses winning bids according to monetary amount included in the bid, preference for bids may also be determined according to time of submission, quantity of merchandise bid for, total bid value, or some other combination of these characteristics. Accordingly, all such modifications and additions are deemed to be within the scope of the invention which is to be limited only by the claims appended hereto.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   registering a plurality of suppliers utilizing an on-line registration form;
   receiving contracts from customers;
   allowing access to the contracts by the suppliers utilizing a network;
   receiving bids on the contracts from the suppliers utilizing the network and an online bid form;
   automatically informing the customers of the bids;
   requiring the suppliers to secure a performance bond relating to the contracts;
   receiving payment from the suppliers; and
   paying the customers a portion of the payment received from the suppliers.

2. The method as recited in claim 1, wherein the payment is based on a percentage of price-related terms and conditions of the contracts.

3. The method as recited in claim 1, further comprising paying the customers.

4. A computer-implemented method, comprising:
   registering a plurality of suppliers utilizing an on-line registration form;
   receiving contracts from customers;
   allowing access to the contracts by the suppliers utilizing a network;
   receiving bids on the contracts from the suppliers utilizing the network and an online bid form;
   automatically informing the customers of the bids;
   requiring the suppliers to secure a performance bond relating to the contracts; and
   receiving payment from the customers.

5. The method as recited in claim 4, wherein the payment is based on terms and conditions of the contracts.

6. The method as recited in claim 1, wherein the contracts includes a work order for goods or services.

7. A computer-implemented method for procuring business,
   comprising:
   registering a plurality of suppliers utilizing an on-line registration form;
   receiving contracts from customers via an on-line form utilizing a network, wherein the contracts are requests for at least one of goods and services, and the network includes the Internet;
   allowing access to the contracts by the suppliers utilizing the network;
   receiving bids on the contracts from the suppliers utilizing the network and an online bid form;
   automatically informing the customers of the bids;
   providing a guarantee to the customers regarding at least one supplier with respect to a provision or fulfillment of the bid received therefrom for reducing an associated risk, wherein the guarantee is provided as a function of at least one action by the at least one supplier;
   receiving payment from the suppliers; and
   paying the customers a portion of the payment received from the suppliers.

8. A computer-implemented method, comprising:
   registering a plurality of suppliers utilizing an on-line registration form;
   receiving goods-related information from customers, the goods-related information being associated with goods;
   allowing access to the goods-related information by the suppliers utilizing a network;
   receiving offers relating to the goods from the suppliers utilizing the network and an online offer form;

automatically informing the customers of the offers;
providing a guarantee to the customers regarding a qualification of at least one supplier with respect to a provision or fulfillment of the offer received therefrom;
wherein the guarantee is provided as a function of at least one action by the at least one supplier;
receiving payment from the suppliers; and
paying the customers a portion of the payment received from the suppliers.

9. The method as recited in claim 8, wherein the goods-related information includes at least one order.

10. The method as recited in claim 8, wherein the goods-related information includes at least one contract.

11. The method as recited in claim 8, wherein the offers include bids.

12. The method as recited in claim 11, wherein the bids are directly related to the goods.

13. The method as recited in claim 12, wherein the bids are directly related to an actual cost of the goods.

14. The method as recited in claim 8, wherein the guarantee involves a performance bond.

15. The method as recited in claim 8, wherein the suppliers are indicated as being bonded.

16. The method as recited in claim 8, wherein the action includes securing of a performance bond.

17. A computer program product embodied on a computer readable medium, comprising:
computer code for registering a plurality of suppliers utilizing an online registration form;
computer code for receiving goods-related information from customers, the goods-related information being associated with goods;
computer code for allowing access to the goods-related information by the suppliers utilizing a network;
computer code for receiving offers relating to the goods from the suppliers utilizing the network and an online offer form;
computer code for informing the customers of the offers;
computer code for providing at least a partial guarantee to the customers regarding a qualification of at least one supplier with respect to a provision or fulfillment of the offer received therefrom;
computer code for receiving payment from the suppliers; and
computer code for paying the customers a portion of the payment received from the suppliers;
wherein the computer program product is operable such that the at least partial guarantee is provided as a function of the at least one supplier.

18. A computer-implemented method, comprising:
registering a plurality of suppliers utilizing an on-line registration form;
receiving goods-related information from customers, the goods-related information associated with goods;
automatically informing the customers of offers from the suppliers for the provision or fulfillment of the goods, the provision or fulfillment of the goods being secured by a performance bond;
receiving payment from the suppliers; and
paying the customers a portion of the payment received from the suppliers;
wherein the customers is at least partially guaranteed that the suppliers are qualified, based, at least in part, on the supplier.

19. A computer-implemented method for procuring business, comprising:
registering a plurality of suppliers utilizing an on-line registration form;
receiving contracts from customers via an on-line contract form utilizing a network, wherein the contracts are requests for at least one of goods and services, and the network includes the Internet;
allowing access to the contracts by the suppliers utilizing the network and a secure personalized profile driven network accessible via the Internet, wherein the contracts are represented in a standard form;
receiving bids on the contracts from the suppliers utilizing the network and an online bid form;
automatically informing the customers of the bids;
providing a guarantee to the customers regarding at least one supplier with respect to a provision or fulfillment of the bid received therefrom, wherein the guarantee is provided as a function of at least one action by the at least one supplier;
receiving payment from the suppliers; and
paying the customers a portion of the payment received from the suppliers.

20. The method as recited in claim 19, further comprising performing a qualification process for determining the integrity of the plurality of suppliers.

21. The method as recited in claim 19, further comprising limiting the bids based on at least one of a financial disincentive approach and a behavior modeling algorithm.

22. The method as recited in claim 19, further comprising requiring the suppliers to secure a performance bond relating to the contracts for reducing the risk of the suppliers failing to fulfill the contracts.

23. A computer-implemented method for procuring business, comprising:
registering a plurality of suppliers utilizing an on-line registration form;
receiving contracts from customers via an on-line contract form utilizing a network, wherein the contracts are requests for at least one of goods and services, and the network includes the Internet;
allowing access to the contracts by the suppliers utilizing the network and a secure personalized profile driven network accessible via the Internet, wherein the contracts are represented in a standard form;
receiving bids on the contracts from the suppliers utilizing the network and an online bid form;
validating the bids to ensure data values entered are credible;
if a bid is determined to be invalid, returning an error message to the supplier that made the bid, where the error message itemizes at least one error found in the bid;
automatically informing the customers of the bids;
receiving payment from the customer;
sending the payment to the supplier; and
providing a guarantee to the customers regarding at least one supplier with respect to a provision or fulfillment of the bid received therefrom, wherein the guarantee is provided as a function of at least one action by the at least one supplier.

24. The method as recited in claim 23, further comprising performing a qualification process for determining the integrity of the plurality of suppliers.

25. The method as recited in claim 23, further comprising limiting the bids based on at least one of a financial disincentive approach and a behavior modeling algorithm.

26. The method as recited in claim 23, further comprising requiring the suppliers to secure a performance bond relating to the contracts for reducing the risk of the suppliers failing to fulfill the contracts.

* * * * *

UNITED STATES PATENT AND TRADEMARK OFFICE
CERTIFICATE OF CORRECTION

| | | |
|---|---|---|
| PATENT NO. | : 7,899,721 B2 | Page 1 of 1 |
| APPLICATION NO. | : 09/796106 | |
| DATED | : March 1, 2011 | |
| INVENTOR(S) | : Michel K. Bowman-Amuah | |

It is certified that error appears in the above-identified patent and that said Letters Patent is hereby corrected as shown below:

Title page, item 57 (abstract), second to last line "as a function the at least" should read -- as a function of at least --.

Signed and Sealed this
Twenty-sixth Day of April, 2011

David J. Kappos
*Director of the United States Patent and Trademark Office*